United States Patent [19]

Hanzawa et al.

[11] 3,770,176

[45] Nov. 6, 1973

[54] MAGNETIC TAPE RECORDING AND/OR REPRODUCING APPARATUS WITH AN AUTOMATIC START DEVICE

[75] Inventors: Hisashi Hanzawa; Juho Yoneya, both of Tokyo, Japan

[73] Assignee: Sony Corporation, Tokyo, Japan

[22] Filed: Nov. 16, 1972

[21] Appl. No.: 307,134

[30] Foreign Application Priority Data

Nov. 18, 1971 Japan ..... 46/107910 (utility model)

[52] U.S. Cl. ................................ 226/176, 226/188

[51] Int. Cl. ............................................ B65h 17/22

[58] Field of Search ........................ 226/188, 43, 24, 226/176, 177, 174

[56] References Cited

UNITED STATES PATENTS 3,589,583 6/1971 Tout .................................. 226/176

3,608,806 9/1971 Butle.................................. 226/176

*Primary Examiner*—Allen N. Knowles

*Attorney*—Lewis H. Eslinger et al.

[57] ABSTRACT

An apparatus for recording and/or reproducing signals on a magnetic tape is provided with an automatic start device which includes a stop assembly capable of being set for temporarily halting operation of the tape drive, for example, by moving the pinch roller away from the capstan which is rotated by an electric motor upon energization of the latter, a timer for causing energization of the motor at a predetermined time, and a release assembly operated in response to energization of the motor for releasing the stop assembly and permitting operation of the tape drive.

11 Claims, 2 Drawing Figures

Figure 1:
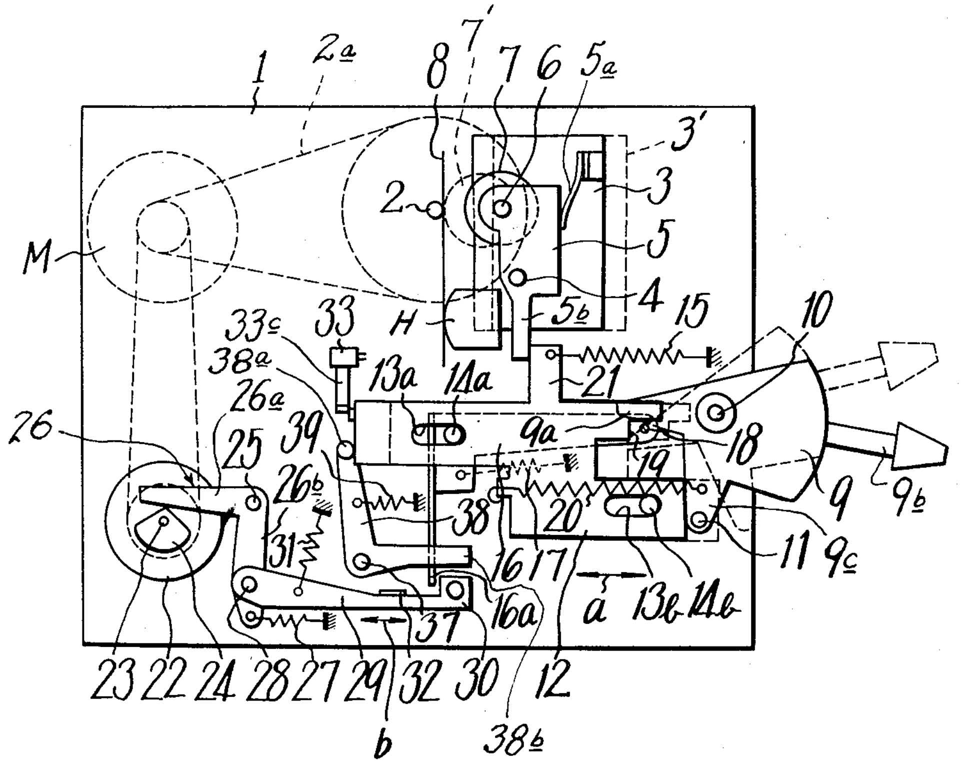

MAGNETIC TAPE RECORDING AND/OR REPRODUCING APPARATUS WITH AN AUTOMATIC START DEVICE

This invention relates generally to apparatus for recording and/or reproducing signals on a magnetic tape, and more particularly is directed to an improved automatic start device by which the recording or reproducing operation of such apparatus can be initiated at a predetermined time.

In existing automatic start devices for apparatus of the described type, the tape drive is rendered inoperative, for example, by spacing the pinch roller from the capstan, by means of the displacement of a lever to a suitable position where such level is held by a lock mechanism, and a timer operates at a predetermined time for energizing a solenoid which releases the lock mechanism and thereby frees the lever for return of the pinch roller to its normal operative position against the rotated capstan. However, in the foregoing existing automatic start device, the solenoid, when energized, has to overcome a substantial force for releasing the lock mechanism and, therefore, the solenoid has to have a relatively large capacity with the result that it is relatively costly and of large volume. Further, the power consumption for energizing the solenoid is relatively great, and this is a particularly serious disadvantage in the case of a battery powered tape recording and/or reproducing apparatus.

Accordingly, it is an object of the present invention to provide a magnetic tape recording and/or reproducing apparatus with an automatic start device which is free of the above mentioned disadvantages of existing automatic start devices.

More specifically, it is an object of this invention to provide a magnetic tape recording and/or reproducing apparatus with an automatic start device which is relatively compact and inexpensive and relatively low in power consumption so as to be suitable for use in a battery powered apparatus, and by which a recording or reproducing operation of the apparatus can be automatically initiated at a predetermined time established by a suitable timer.

In accordance with an aspect of this invention, an apparatus of the described type having a drive means, such as a cooperating capstan and pinch roller, for transporting the magnetic tape past a suitable head during recording or reproducing operation of the apparatus and an electric motor for operating such drive means, for example, by rotating the capstan, when the motor is energized, is provided with stop means operable for temporarily halting the operation of the drive means, for example, by movement of the pinch roller away from the capstan, timer means for causing energization of the motor at a predetermined time, and stop release means operated in response to the energization of the motor by the timer means for releasing the stop means and thereby permitting operation of the drive means for initiating the recording or reproducing operation at such predetermined time. Thus, it will be seen that, in accordance with this invention, the electric motor which is provided, in any case, for operating the drive means, for example, by rotation of the capstan, is also employed for supplying the motive force effecting the release of the stop means which temporarily halts operation of the drive means.

Figure 2:
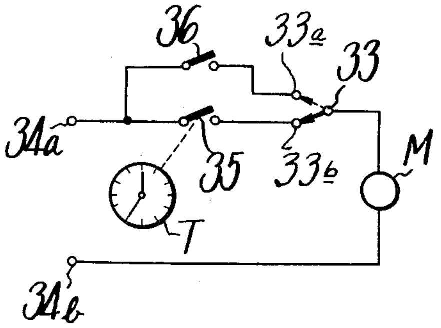

The above, and other objects, features and advantages of the present invention, will be apparent from the following detailed description of an illustrative embodiment of the invention which is to be read in connection with the accompanying drawing forming a part hereof, and wherein:

FIG. 1 is a plan view of a magnetic tape recording and/or reproducing apparatus provided with an automatic start device in accordance with this invention; and FIG. 2 is a diagrammatic view of an electrical control circuit associated with the apparatus of FIG. 1.

Referring to the drawing in detail, and initially to FIG. 1 thereof, it will be seen that only those elements of a magnetic tape recording and/or reproducing apparatus which are essential to an understanding of the present invention are illustrated. More specifically, the apparatus is shown to include a chassis or base 1, for example, constituted by a metal plate, on which a capstan 2 is suitably mounted so as to be rotatable through a belt and pulley transmission 2*a* by an electric motor M upon energization of the latter. A frame member 3 carrying a magnetic recording and/or reproducing head or transducer H is suitably mounted on chassis 1 for movement between the position shown in full lines on FIG. 1, at which the head H is engageable with the magnetic tape 8, and the position indicated in broken lines at 3′, at which the head H is withdrawn from the path of the magnetic tape. Conventional mode selecting control mechanisms (not shown) having manually actuable mode selecting knobs may be provided for disposing frame member 3 in the position shown in full lines when a recording or reproducing operation of the apparatus is desired, and for disposing the frame member in the position shown in broken lines at 3′ for other operating modes of the apparatus, for example, during fast forward or rewinding operations. The frame member 3 further carries a pivot pin 4 on which an arm 5 is pivotally mounted, and the free end portion of arm 5 supports a shaft 6 carrying a rotatable pinch roller 7. A spring 5*a* extends between frame member 3 and pivoted arm 5 for urging the latter in the counterclockwise direction relative to frame member 3 and thereby disposing the pinch roller in the position indicated in broken lines at 7′ so as to be urged against capstan 2 with the tape 8 therebetween when frame member 3 is moved to the position shown in full lines on FIG. 1. Thus, with frame member 3 in the position shown in full lines on FIG. 1 and motor M energized to effect rotation of capstan 2, pinch roller 7 normally cooperates with the capstan to provide a tape drive means by which mangetic tape 8 is continuously transported past head H between supply and takeup reels (not shown) which may be selectively driven from the motor M by conventional transmissions, and the head H functions in the usual manner to record or reproduce signals on the tape.

The automatic start device in accordance with this invention generally functions, when set, to pivot arm 5 against the force of spring 5*a* relative to frame member 3 so as to dispose pinch roller 7 in the position shown in full lines, that is, spaced from capstan 2, even though frame member 3 is in the position shown in full lines for a recording or reproducing operation of the apparatus. The illustrated embodiment of an automatic start device according to this invention is shown to include a control member 9 pivoted on a pin 10 carried by chassis 1 and being movable, as by manual actuation of a handle or knob 9*b*, between the positions shown in full and broken lines, respectively. The control lever 9 has two substantially right-angularly related arms 9*a* and 9*c* extending therefrom, and the arm 9*c* carries a pin 11 which is engageable against one end of a drive stop member or slide 12 mounted on chassis 1, for example, by pins 14*a* and 14*b* carried by the chassis and respectively engaging in elongated slots 13*a* and 13*b* in member 12, for permitting reciprocation of drive stop member 12 in the direction of the arrows *a*. A spring 15 is connected between a projection 21 on member 12 and a suitable anchor on chassis 1 for urging drive stop member 12 toward the right, as viewed on FIG. 1 to the position indicated in broken lines and, by reason of the engagement of member 12 with pin 11, for urging control lever 9 to the position indicated in broken lines.

A lock lever 16 is pivotally mounted on pin 14*a* and is urged in the counterclockwise direction by a spring 17 connected between lock lever 16 and a suitable anchor on chassis 1. A lock pin 18 is carried by the free end of lock lever 16 and is engageable with a keeper constituted by a stepped end portion 19 of member 12. Further, a spring 20 is connected between arm 9*c* of control lever 9 and an anchor on member 12 so as to urge control lever 9 in the clockwise direction for maintaining engagement of pin 11 with the adjacent end of member 12. It will also be seen that the projection 21 of member 12 is engageable with an extension 5*b* of the pinch roller arm 5 so that, when control lever 9 is moved from the position shown in broken lines to the position shown in full lines and pin 11 thereon acts against member 12 to displace the latter against the force of spring 15 to the position shown in full lines, projection 21 acts against extension 5*b* to pivot arm 5 and thereby space pinch roller 7 from capstan 2. Upon movement of member 12 to the position shown in full lines, lock lever 16 is urged by spring 17 in the counterclockwise direction for engaging lock pin 18 with keeper 19 and thereby locking member 12 in the position shown in full lines for maintaining pinch roller 7 away from capstan 2 and thereby halting operation of the tape drive means.

If control lever 9 is manually returned from the position shown in full lines to the position shown in broken lines, for example, for cancelling the setting of the automatic start device, the arm 9*a* of control lever 9 which extends adjacent lock pin 18, as shown, acts against such lock pin for pivoting lock lever 16 on the clockwise direction against the force of spring 17 and thereby releasing lock pin 18 from the keeper or stepped end portion 19 of member 12. Upon such release of lock pin 18 from keeper 19, spring 15 can return member 12 toward the right, as viewed on FIG. 1, to the position shown in broken lines at which projection 21 moves away from extension 5*b* of the pinch roller arm and thereby permits spring 5*a* to again press pinch roller 7 against capstan 2, with the tape 8 therebetween for driving the latter.

In order to effect the automatic timed release of lock lever 16, the device according to this invention is further shown to include a belt and pulley transmission 22 driven from the shaft of motor M for effecting rotation of a shaft 23 upon the energization of the motor. A cam 24 is fixed on shaft 23 and is engageable by one arm 26*a* of a bellcrank 26 pivotally mounted on a pin 25 carried by chassis 1 and which has its other arm 26*b* connected to a spring 27 anchored to the chassis for maintaining engagement of bellcrank arm 26*a* with cam 24. The bellcrank arm 26*b* is pivotally connected, as at 28, to one end of a lock release member 29 which is urged by a spring 31 into slidable engagement with an abutment 32 extending from chassis 1. It will be apparent that, upon energization of motor M, the resulting rotation of cam 24 causes oscillation of bellcrank 26 with the result that lock release member 29 is reciprocated, as indicated by the arrows *b*, in a normal path that is established by the slidable engagement of lock release member 29 with abutment 32. The end of lock release member 29 remote from bellcrank arm 26*b* has a nose 30 thereon which, during reciprocation of member 29 in the normal path established by its slidable engagement with abutment 32, is engageable with an extension 16*a* of lock lever 16. Thus, when member 29 is reciprocated in its normal path, the movement of that member toward the left, as viewed on FIG. 1, causes nose 30 to act on lever extension 16*a* for pivoting lock lever 16 in the clockwise direction and thereby releasing its lock pin 18 from keeper 19.

In order to ensure that the reciprocated lock release member 29 is engageable with lever extension 16*a* only when the automatic start device according to this invention is set to initiate a recording or reproducing operation at a predetermined time, the automatic start device is further shown to include a deactivating bellcrank 38 pivotally mounted on a pin 37 carried by chassis 1 and being urged in the clockwise direction by a spring 39 so as to maintain engagement of a pin 38*a* at one end of bellcrank 38 with an end portion of slide 12. The other end portion 38*b* of deactivating bellcrank 38 is disposed adjacent nose 30 of lock release member 29 and is spaced from nose 30 when bellcrank 38 is turned against the force of spring 39 to the position shown on FIG. 1 in response to the displacement of slide 12 to the position shown in full lines. However, when slide 12 is returned by spring 15 to its normal position shown in broken lines, that is, when slide 12 is moved toward the right, spring 39 overcomes the force of spring 31 and causes clockwise turning of bellcrank 38 so that end 38*b* of that bellcrank acts on nose 30 for deflecting lock release member 29 out of its normal path, that is, away from abutment 32, for disengaging nose 30 from lever extension 16*a*. From the foregoing it will be apparent that, during regular recording or reproducing operation, lock release member 29 is released from extension 16*a* of lock lever 16 for avoiding oscillation of the latter in response to the continued energization of motor M.

The automatic start device according to this invention further includes a control circuit by which motor M is deenergized upon the setting of the automatic start device and the energization of the motor is thereafter automatically initiated at a predetermined time. As shown particularly on FIG. 2, such control circuit for motor M may include terminals 34*a* and 34*b* connected with a suitable DC power source (not shown) and to which the motor is connected through one or the other of alternative parallel paths by way of a changeover switch 33. One of these alternative parallel paths includes a normally open timer switch 35 which is closed by a conventional timer T at a predetermined time which is selected by setting of the timer, and the other of the alternative parallel paths includes a normally open switch 36 which is closed when the usual controls of the apparatus are manipulated to select either a recording or a reproducing mode of operation. The timer switch 33 normally closes its contact 33*a* for connecting motor M to the power source by way of the alternative path having the switch 36 interposed therein. As shown on FIG. 1, changeover switch 33 is mounted on chassis 1 adjacent slide 12 so that, when slide 12 is in the position shown in full lines as a result of the setting of the automatic start device, an actuator 33*c* of changeover switch 33 is engaged by slide 12 and causes closing of the contact 33*b* of the change-over switch, as shown in full lines on FIG. 2, whereby to connect motor M with the power source by way of the alternative path having timer switch 35 interposed therein.

The above described embodiment of an automatic start device in accordance with this invention operates as follows:

When a recording or reproducing mode of operation is selected and control member 9 of the automatic start device is in its normal position indicated in broken lines on FIG. 1, spring 15 displaces slide 12 toward the right from the position shown in full lines so that spring 5*a* can urge pinch roller 7 against capstan 2 with the tape 8 therebetween. Further, the described movement of slide 12 releases the actuator 33*c* of changeover switch 33 so that contact 33*a* of the latter is closed and motor M is energized by way of the closed switch 36. The energized motor M causes rotation of capstan 2 by way of the belt and pulley transmission 2*a* so that magnetic tape 8 gripped between the rotated capstan 2 and pinch roller 7 is transported in the normal fashion for the recording or reproducing of signals on the tape by head H.

With timer T set for a predetermined subsequent time, the actuation of control member 9 to the position shown in full lines on FIG. 1 causes displacement of slide 12 to the position shown in full lines, whereby projection 21 acts on extension 5*b* of the pinch roller arm for moving pinch roller 7 away from capstan 2 and thereby halting the driving of the tape. The displaced slide 12 acts on actuator 33*c* of change-over switch 33 for closing contact 33*b* of the changeover switch and thus connecting motor M with the alternative path having the open timer switch 35 therein. Accordingly, motor M is deenergized so long as timer switch 35 remains in its open condition. As previously described, upon the movement of slide 12 to the position shown in full lines on FIG. 1, lock pin 18 on lock lever 16 engages keeper 19 on slide 12 for maintaining the latter in such full line position.

At the predetermined time for which timer T has been set, timer switch 35 is automatically closed for initiating the energization of motor M. During the initial energization of motor M, the resulting rotation of cam 24 causes reciprocation of lock release member 29 in its normal path so that nose 30 of the lock release member acts on lever extension 16*a* for turning lock lever 16 against the force of spring 17 and thereby releasing lock pin 18 from keeper 19. The release of lock pin 18 from keeper 19 then permits spring 15 to move slide 12 toward the right so that projection 21 moves away from extension 5*b* of the pinch roller arm and thereby again permits the pressing of pinch roller 7 against capstan 2 for initiating the transporting of magnetic tape 8. The described movement of slide 12 upon the release of lock pin 18 from keeper 19 further releases slide 12 from actuator 33*c* of changeover switch 33 so that the changeoever switch again closes its contact 33*a* and the motor then continues to be energized through the closed switch 36. Finally, the return of slide 12 to its normal position permits spring 39 to turn bellcrank 38 so that its end 38*b* acts on nose 30 for deflecting lock release member 29 out of its normal path and thereby disengaging nose 30 from lever extension 16*a*. Thereafter, the recording and/or reproducing apparatus continues to operate in its normal recording or reproducing mode.

From the foregoing description of the operation of the automatic start device according to this invention, it will be apparent that a magnetic tape recording and/or reproducing apparatus equipped with such device may, if set for its reproducing mode of operation, act as an alram clock for awakening the user by reproducing suitable music previously recorded on the tape 8. On the other hand, if the apparatus is set for its recording mode of operation and connected with a radio for receiving signals from the latter as its input, the apparatus may be made to automatically record broadcast music or other programs commencing at the time for which the timer T is set.

Since the motive force for releasing the lock lever 16 from the slide 12 is derived from the usual motor M employed for driving the capstan 2, it will be apparent that the automatic start device according to this invention can be embodied in a compact and relatively inexpensive apparatus which has modest power requirements and, therefore, permits the apparatus to be battery-powered.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention.

What is claimed is:

1. In an apparatus for recording and/or reproducing signals on a magnetic tape, the combination of drive means for transporting the magnetic tape, an electric motor for operating said drive means when said motor is energized, stop means operable for temporarily holding the operation of said drive means, timer means for causing energization of said motor at a predetermined time, and stop release means operated in response to said energization of the motor by said timer means for releasing said stop means and permitting operation of said drive means, whereby to initiate said transporting of the magnetic tape at said predetermined time.

2. In an apparatus for recording and/or reproducing signals on a magnetic tape, the combination according to claim 1; in which said drive means includes a capstan driven from said motor and a pinch roller movable toward and away from said capstan for respectively engaging and disengaging said tape therebetween; and in which said stop means includes a drive stop member movable between an operative position and an inoperative position for respectively moving said pinch roller away from said capstan and permitting movement of said pinch roller toward said capstan, and lock means operative upon movement of said drive stop member to said operative position for holding said drive stop member in said operative position of the latter, and said stop release means acts on said lock means for releasing the latter from said drive stop member and permitting return thereof to said inoperative position in response to said energization of the motor by said timer means.

3. In an apparatus for recording and/or reproducing signals on a magnetic tape, the combination according to claim 2; further comprising circuit means for energizing said motor through alternative paths and including change-over switch means for connecting said motor with one of said paths and with the other of said paths when said drive stop memer is in said operative and inoperative positions, respectively; and in which said timer means includes a normally open switch interposed in said one path and being closed at said predetermined time for effecting said energization of the motor through said one path.

4. In an apparatus for recording and/or reproducing signals on a magnetic tape, the combination according to claim 3; in which said circuit means further includes a second switch interposed in said other path and being operable to control the energization of said motor when said drive stop member is in said inoperative position thereof.

5. In an apparatus for recording and/or reproducing signals on a magnetic tape, the combination according to claim 2; in which said stop means includes means yieldably urging said drive stop member to said inoperative position, and a manually actuable control member engageable with said drive stop member and with said lock means and being movable between a first position, in which said drive stop member is displaced to said operative position thereof, and a second position, in which said lock means is released from said drive stop member and the latter is permitted to return to said inoperative position thereof.

6. In an apparatus for recording and/or reproducing signals on a magnetic tape, the combination according to claim 2; in which said stop release means includes a release member actuated by said motor upon energization of the latter, means yieldably urging said release member into engagement with said lock means for releasing the latter upon actuation of said release member by said motor, and deactivating means rendered operative by return of said drive stop member to said inoperative position of the latter for holding said release member out of engagement with lock means.

7. In an apparatus for recording and/or reproducing signals on a magnetic tape, the combination according to claim 6; in which said stop release means further includes a cam rotated by said motor upon said energization thereof, and means for reciprocating said release member in response to rotation of said cam; and in which said means yieldably urging said release member holds the latter for reciprocation in a path into which said lock means extends so as to be released by said reciprocating of the release member, and said deactivating means, when rendered operative, deflects said release member out of said path so as to be free of said lock means when said release member is reciprocated by the motor.

8. In an apparatus for recording and/or reproducing signals on a magnetic tape, the combination according to claim 1; further comprising circuit means for energizing said motor through alternative paths and including change-over switch means for connecting said motor with one of said paths when said stop means is operable to halt said drive means and for connecting said motor with the other of said paths when said stop means is released; and in which said timer means includes a normally open switch interposed in said one path and being closed at said predetermined time for effecting energization of said motor through said one path.

9. In an apparatus for recording and/or reproducing signals on a magnetic tape, the combination according to claim 8; in which said circuit means further includes a second switch interposed in said other path and being operable to control the energization of said motor when said stop means is released.

10. In an apparatus for recording and/or reproducing signals on a magnetic tape, the combination according to claim 1; in which said stop means includes a manually actuable control member movable between a first position in which said stop means is rendered operative to halt the operation of said drive means and a second position in which said control member releases said stop means.

11. In an apparatus for recording and/or reproducing signals on a magnetic tape, the combination according to claim 1; in which said drive means includes a capstan driven from said motor and a pinch roller movable toward and away from said capstan for respectively engaging and disengaging said tape therebetween, and said stop means is operable to move said pinch roller away from said capstan; and further comprising circuit means for energizing said motor through alternative paths and including change-over switch means operable to connect said motor with one of said paths and with the other of said paths respectively in response to the operation and release of said stop means, and a normally open switch is interposed in said one path and being closed by said timer means at said predetermined time.

* * * * *